Dec. 8, 1959  J. R. SECORD ET AL  2,916,314
ROTARY SHAFT SEAL
Filed Oct. 25, 1954

INVENTOR
John R. Secord &
BY Edward A. Chapin
J. C. Thorpe
ATTORNEY

United States Patent Office 2,916,314
Patented Dec. 8, 1959

2,916,314

ROTARY SHAFT SEAL

John R. Secord, Detroit, and Edward A. Chapin, Flat Rock, Mich., assignors to General Motors Corporation, Detroit, Mich., a corporation of Delaware Application October 25, 1954, Serial No. 464,198

10 Claims. (Cl. 286—11.14)

This invention relates to a seal to be located between relatively rotatable parts.

Among the principal objects of the invention is to provide an improved seal in the form of a relatively low cost dependable self-contained unit of simplified construction which will operate effectively to prevent passage of oil, grease, gas, or other fluid with which used and which can be easily installed or removed for inspection and replacement when necessary.

Other objects and advantages of the invention will become apparent from the following detailed description of several preferred embodiments thereof in which reference is made to the attached drawing in which.

Figure 1:
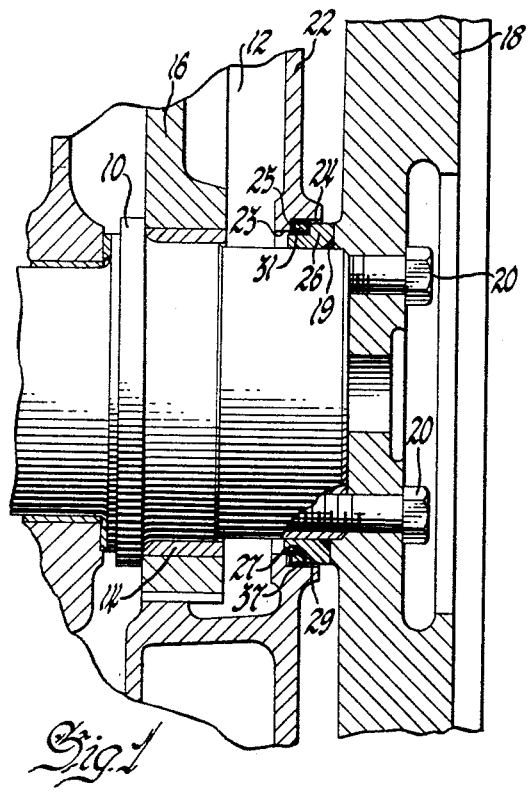
Figure 1 is a fragmentary axial sectional view of an apparatus having a shaft subjected to translatory axial vibrations which is journaled in and projects from a housing member and one form of the improved rotary seal interposed between the housing member and the shaft.

Referring more particularly to the drawing, Figure 1 shows the end portions of an engine housing 12 having a crankshaft 10 rotatably journaled in a main bearing 14 mounted in a bearing web 16. The shaft 10 projects from the engine housing and has a flywheel 18 secured to the end thereof by the stud bolts 20. Such engine crankshafts are subject to translatory gyrations and axial vibration at the end portions thereof which are induced by the torsional loadings that are applied thereto. These vibrations result in radial oscillation and axial reciprocation of these portions of the crankshaft with respect to the main bearing seals.

Figure 2:
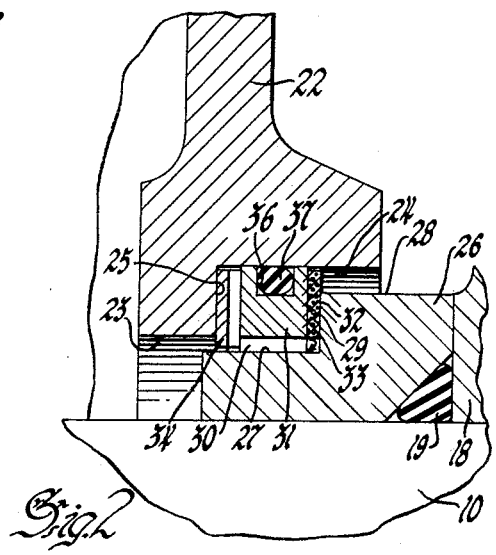
Figure 2 is an enlarged view similar to Figure 1.
Figure 3:
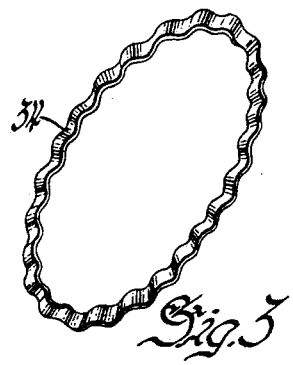
Figure 3 is a perspective view of one element shown in the form of the invention of Figure 1.

In the form of the invention shown by Figures 1, 2 and 3, the engine housing is provided with a web member 22 having a bore 23 and counterbore 24 in spaced concentric relation with the end portion of the crankshaft and joined by a radially extending shoulder portion 25. An annular carrier member 26 having stepped concentric outer surfaces 27 and 28 joined by a radially extending shoulder 29 is non-rotatively secured to the end portion of the crankshaft by suitable means, not shown. The stepped surface portions 27 and 28 of the member 26 are telescopically embraced by the bore 23 and the counterbore 24 with the shoulder portions 25 and 29 thereof in spaced axial relation to form an annular chamber 30 therebetween. A piston-type ring 31 of either the split or solid type located in the chamber 30 has one end face or side surface 32 thereof in bearing relation with the shoulder 29 and has a self-contained radial biasing action urging the outer surface thereof outwardly into non-rotative circumferential or peripheral sealing contact with the counterbore 24 of the housing web 22. The inwardly facing surface of the ring 31 is in spaced relation to the surface 27 of the carrier member 26. The end face 32 of the ring 31 is maintained in sealing and bearing relation with the shoulder 29 by a low-rate corrugated annular spring ring 34, as best shown in Figure 3, which is interposed between the shoulder 25 and the opposite end face of the piston-type ring 31. The end face 32 of the ring 31 which is in bearing relation with the shoulder 29 may be provided with a porous bearing material as indicated at 33 to insure proper lubrication therebetween. The non-rotative connection between the carrier member 26 and the crankshaft 10 is sealed by an O-ring 19 interposed in an annular space formed between the crankshaft, the carrier member, and the flywheel 18.

The ring 31 is provided with an outwardly facing circumferential groove 36 having an O-ring 37 therein. The O-rings 19 and 37 are both of an elastomeric material preferably resistant to oil, grease, gas, or other fluid with which they are used. The O-ring 37 is normally round in cross section, of a diameter less than the width of the groove 36, and projects beyond the side walls of the groove when not subjected to radially compressive loading against the surface of the counterbore 24 by the biasing action of the ring 31. Under the biasing action of the ring 31, the O-ring is compressed radially tending to axially elongate the O-ring into engagement with the side walls of the groove.

Figure 4:
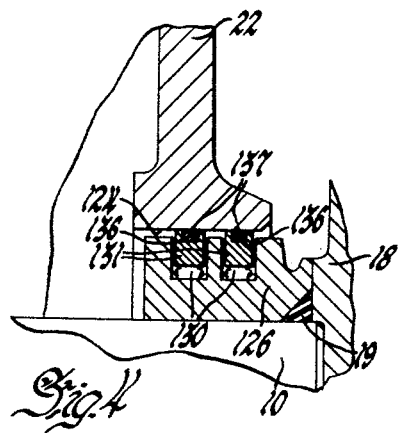
Figure 4 is a view similar to Figure 2 showing a modified form of the invention.

In the form of the invention shown in Figure 4, the web 22 of the engine housing is provided with a single bore 124 in spaced concentric relation with the end of the crankshaft 10. An annular carrier member 126 is non-rotatively secured to the end portion of the crankshaft and is sealed therewith by an elastomeric O-ring 19 interposed between the carrier and the flywheel 18. The carrier member 126 is provided with one or more outwardly facing parallel circumferential grooves 130 of rectangular cross section having axially spaced side walls or shoulders interconnected by a bottom wall of reduced diameter. Each of these grooves 130 is provided with a piston-type ring or gasket assembly 131 similar to the gasket ring 31 provided in the aforedescribed form of the invention and having a self-contained radial biasing action urging the ring into non-rotative peripheral or circumferential sealing contact with the bore 124. Each of the piston-type rings 131 has an outwardly facing circumferential groove 136 therein. A normally round elastomeric O-ring 137 is interposed in each groove 136 and is subjected to radially compressive loading against the surface of the bore 124 by the biasing action of the ring 131. The inwardly facing surface of the piston-type rings are in spaced relation to the bottom wall of their respective grooves while the end faces thereof have a running fit or clearance with the side walls of the grooves 130. This clearance is exaggerated in Figure 4 for the purpose of illustration.

Figure 5:
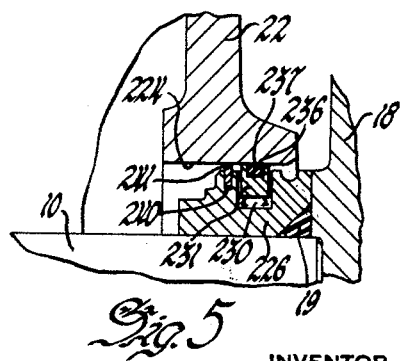
Figure 5 is a view similar to Figure 2 showing another modified form of the invention.

In the form of the invention shown by Figure 5, the annular carrier member 226, which is non-rotatively secured to the crankshaft 10 and sealed therewith by an O-ring seal 19, is provided with a circumferential groove 240 of narrow axial dimension and a second circumferential groove 230 parallel to the first groove and of greater axial dimension. A relatively narrow ring or washer 241 is interposed between the first groove and the bore 224 and a piston-type ring or gasket assembly 231, similar to that shown in the form of the invention of Figure 4, is mounted in the second groove. The inwardly facing surfaces of the rings 241 and 231 are in radially spaced relation to the bottom walls of their respective carrier grooves 240 and 230 and both rings have a self-contained radial biasing action urging them into non-rotative peripheral or circumferential sealing contact with the bore 224. The ring 231 is provided with an outwardly facing circumferential groove 236 and a normally round elastomeric O-ring 237 mounted therein is radially compressed against the bore 224 by the bottom wall of the piston ring groove.

In operation, the O-ring seals 37, 137, and 237 of the various illustrated forms of the invention are maintained in radial compressive loading with the bores 24, 124, and 224, respectively, to augment the self-sealing biasing action of the several piston type rings bearing against these bores to prevent axial fluid leakage between the piston-type rings and these ring-engaged bores. The O-rings 19 prevent axial fluid leakage between the various annular carrier members and the shaft 10. The sealing action between the piston-type ring or rings and the several rotating annular carrier members is accomplished by the centrifugal action of the fluid between the side surfaces of the rings and of the grooves or shoulders of the annular carrier member opposite the timing gear flywheel 18 in the forms of the invention shown in Figures 4 and 5 and by small toroidal vortices which are set up in the fluid in the spaces between the surfaces of the piston-type rings, the housing bore, and of the carrier member by the relative rotation of these surfaces in the several forms of the invention. These toroidal vortices are indicated by the small arrows shown in Figures 2, 4 and 5. The spaced relationship provided between the bore of the housing web and the surfaces of the piston ring with respect to the various surfaces of the carrier member is such that the velocities within the vortices will prevent fluid from passing through the seal. The translatory gyratory and axial vibratory motions of the crankshaft relative to the housing web 22 are accommodated by the clearances between the various elements, and under extreme conditions the axial vibrations of such crankshaft vibrations will be accommodated by the O-ring snubbed axial reciprocation of the piston rings.

While several different embodiments of the invention have been shown and described for the purposes of illustration, it will, of course, be appreciated that the invention is capable of being embodied in various other structurally modified forms coming equally within the scope of the following claims.

We claim:
1. A fluid seal comprising, in combination, two relatively rotatable concentric members forming an annular chamber therebetween, said chamber having axially spaced side walls and radially spaced inner and outer walls, a spring ring having a circumferential groove interposed in said chamber, said ring having a radially biasing action urging said ring into circumferential non-rotative frictional contact with one of said members closing said groove, a ring of elastomeric material interposed in said groove between said spring ring and said one member and subjected to radially compressive loading therebetween by the biasing action of said spring ring, and a second spring ring in said annular chamber axially biasing said first spring ring into bearing engagement with one of said side walls.

2. A fluid seal comprising, in combination, two relatively rotatable concentric members, one of said members having an annular shoulder formed thereon, a first spring ring having a porous end surface in bearing engagement with said annular shoulder, said ring being biased radially into circumferential non-rotative frictional contact with the other of said members and into concentrically spaced relation with said one member, said first ring having a circumferential groove facing said other member and a ring of elastomeric material interposed in said groove between said first spring ring and said second member, and a second spring ring maintaining said first ring in bearing engagement with said annular shoulder.

3. A fluid seal comprising, in combination, two relatively rotatable concentric members, one of said members having an annular shoulder formed thereon, a spring ring having an end surface thereof in bearing engagement with said annular shoulder, said ring being biased radially into circumferential non-rotative frictional contact with the other of said members and into concentrically spaced relation with said one member, said spring ring having a circumferential groove facing said other member, and a ring of elastomeric material interposed in said groove between said spring ring and said other member, said elastomeric ring being subjected to radially compressive loading between said other member and said spring ring.

4. In combination, two relatively rotatable concentric members, one of said members having a circumferential groove therein forming an annular chamber therebetween, a spring ring in said groove being biased radially into circumferential contact with the other of said members and in spaced concentric relation with the bottom wall of said groove, said ring having a circumferential groove facing said other member, and a ring of elastomeric material interposed in said last-mentioned groove and subjected to radially compressive loading between said spring ring and said second member.

5. A fluid seal comprising, in combination, two relatively rotatable concentric members, one of said members having a circumferential groove formed therein, a ring mounted in said groove having non-rotative circumferential contact with the other of said members, said ring having end faces in rotative bearing engagement with the side walls of said groove and having its other circumferential face portion in spaced relation to the bottom wall of said groove, said ring having a circumferential groove facing said second member, and a ring of elastomeric material interposed in said last-mentioned groove and subjected to radially compressive loading by the second cylindrical member and said first ring.

6. In a fluid seal as set forth in claim 3, said elastomeric ring normally being of axial dimension less than the width of said groove and projecting radially beyond the edges of the side walls thereof when in engagement with the bottom wall thereof so that the biasing action of said first-mentioned ring subjects said second ring to radially compressive loading against said cylindrical member to thereby axially expand said second ring into engagement with the side walls of said groove.

7. A fluid seal for a rotary shaft member which is subjected to axial vibration and journaled in and projects from a housing member having a bore therein in spaced concentric relation to said shaft member, said seal comprising, in combination, an annular carrier member secured to said shaft member within said housing bore, said annular member having a laterally extending shoulder formed thereon, a ring in bearing relation with said shoulder having a self-contained biasing action urging said ring into frictionally maintained non-rotative circumferential contact with said bore at its outer diameter and into concentrically spaced relation with said annular member at its inner diameter, said ring having a circumferential groove therein facing said bore, and a ring of elastomeric material interposed in said groove and subjected to radially compressive loading against the bore of said housing member by the biasing action of said first-mentioned ring.

8. A fluid seal for a rotary shaft member which is subjected to axial vibration and journaled in and projecting from a housing member having a bore therein in spaced concentric relation to said shaft member, said seal comprising, in combination, an annular member secured to said shaft member within said housing bore, said annular member having a plurality of outwardly facing parallel circumferential grooves therein, each of said grooves having a ring therein having a self-contained biasing action urging said ring into non-rotative circumferential contact with the bore of said housing member, each of said rings being in spaced relation to the bottom wall of its respective groove and having an outwardly facing circumferential groove therein, and a ring of elastomeric material mounted in each of said last-mentioned grooves subjected to radially compressive loading against the bore of said housing member by the biasing action of said first-mentioned rings.

9. A fluid seal for a rotary shaft member subjected to axial vibratory translation which is journaled in and projects from a housing member having a bore therein in spaced concentric relation to said shaft member, said seal comprising, in combination, an annular carrier member secured to said shaft member within said housing bore, said annular member having an outwardly facing circumferential groove of narrow axial dimension, a ring mounted in said groove in circumferential contact with said housing bore and in spaced relation to the bottom wall of said groove, a second outwardly facing circumferential groove of greater axial dimension formed in said annular member in parallel relation to said first groove, a second ring mounted in said second groove in spaced relation to the bottom wall thereof and having a self-contained biasing action urging said ring into non-rotative circumferential contact with said bore, said piston-type ring having a circumferential groove therein, and a third ring of elastomeric material mounted in said groove and subjected to radially compressive loading against the bore of said housing member by the biasing action of said second spring.

10. In a fluid seal as set forth in claim 7, an annular spring interposed between said housing member and said first-mentioned ring and axially biasing said first-mentioned ring into bearing engagement with said shoulder.

References Cited in the file of this patent

UNITED STATES PATENTS

| | | |
|---|---|---|
| 1,544,609 | Somes | July 7, 1925 |
| 1,644,489 | Pitman | Oct. 4, 1927 |
| 2,402,033 | Flinn | June 11, 1946 |
| 2,570,427 | Chillson et al. | Oct. 9, 1951 |
| 2,706,652 | Berger | Apr. 19, 1955 |

FOREIGN PATENTS

| | | |
|---|---|---|
| 632,957 | Great Britain | Dec. 5, 1949 |